(12) United States Patent
Kim

(10) Patent No.: US 6,489,575 B2
(45) Date of Patent: *Dec. 3, 2002

(54) SENSOR PANEL POSITION COORDINATES SIGNAL DETECTING CIRCUIT

(75) Inventor: Do-youn Kim, Suwon (KR)

(73) Assignee: Samsung Electronics Co., Ltd. (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/300,924

(22) Filed: Apr. 28, 1999

(65) Prior Publication Data

US 2002/0044137 A1 Apr. 18, 2002

(30) Foreign Application Priority Data

Aug. 14, 1998 (KR) .............................. 98-33070

(51) Int. Cl.[7] .............................................. G08C 21/00
(52) U.S. Cl. ................ 178/18.05; 345/173; 345/174; 345/175; 345/179; 178/18.01; 178/18.02; 178/18.03; 178/18.06
(58) Field of Search .................. 345/173, 176, 345/104, 174, 178; 178/18.01, 18.02, 18.03, 18.04, 18.05, 19

(56) References Cited

U.S. PATENT DOCUMENTS

| | | | |
|---|---|---|---|
| 4,853,493 A | * | 8/1989 | Schlosser et al. ............ 178/18 |
| 5,124,509 A | * | 6/1992 | Hoendervoogt et al. ...... 178/19 |
| 5,574,262 A | * | 11/1996 | Petty ........................... 345/173 |
| 5,682,019 A | * | 10/1997 | Katsurahira et al. ........ 345/176 |
| 5,841,427 A | * | 11/1998 | Teterwak ..................... 345/173 |
| 5,936,207 A | * | 8/1999 | Kobayashi et al. .......... 345/176 |
| 5,986,646 A | * | 11/1999 | Chen et al. .................. 345/173 |
| 5,994,651 A | * | 11/1999 | Partow et al. ................ 178/18 |

* cited by examiner

*Primary Examiner*—Richard Hjerpe
*Assistant Examiner*—Ali Zamani
(74) *Attorney, Agent, or Firm*—Mills & Onello, LLP

(57) ABSTRACT

A position coordinates signal detecting circuit of a sensor panel is provided. The position coordinates signal detecting circuit of the sensor panel according to the present invention includes first through fourth resistors each of which has one end connected to one of the left upper-most edge, the left lower-most edge, the right upper-most edge, and the right lower-most edge of the sensor panel. First through fourth driving signal generators are respectively connected to the other side of the first through fourth resistors for generating a driving signal so as to drive the sensor panel. Analog switches receive first through fourth pairs of voltages respectively generated at both ends of the first through fourth resistors. The first through fourth pairs of voltage are multiplexed in response to first through fourth selecting signals to provide a multiplexed signal, and a differential amplifier for amplifies the multiplexed signal. The position coordinates detecting circuit of the sensor panel according to the present invention makes it possible to amplify the voltage difference between both end of the variable resistors. Thus, the characteristics mismatching between different amplifiers is reduced, and the position coordinates are detected accurately.

6 Claims, 3 Drawing Sheets

SENSOR PANEL POSITION COORDINATES SIGNAL DETECTING CIRCUIT

BACKGROUND OF THE INVENTION

1. Field of the Invention

The present invention relates to a data input apparatus, and more particularly, to a position coordinates signal detecting circuit of a sensor panel for sensing position coordinates at which contacts occur.

2. Description of the Related Art

As information terminals become smaller in size and larger in functional complexity, the types of input devices for providing data And information to the information terminals become more varied. For example, one input apparatus that is widely used for providing input commands or characters is a sensor panel coated with a resistance component. In such a device, characters and information are entered by pressing on the sensor panel at particular predefined locations. By detecting the position at which a contact is made on the panel, the system can determine the desired input. To that end, sensor panels typically include detection circuitry for detecting the locations of contacts.

In one example of such a position coordinates signal detecting circuit of a sensor panel, the position at which a contact occurs is detected by detecting the pairs of voltages at both ends of series resistances connected to the four edges of the sensor panel. The sensor panel resistances are driven by applying a driving signal of the same level through the connected resistors. Since the pairs of voltages on both sides of the contact point change according to the position of the contact point, it is possible to display the position of the point at which the contact occurred as coordinates by detecting the pairs of voltages at both ends of the resistors.

In conventional technology, four differential amplifiers are used for a position coordinates signal detecting circuit in order to separately amplify the pairs of voltages at the ends of the resistors connected to the respective edges. Also, variable resistors are generally used for the resistors connected to the respective edges of the sensor panel in order to correct internal impedance mismatching at the respective corners of the sensor panel.

In the position coordinates signal detecting circuit using four differential amplifiers, it is desirable that the characteristics of the differential amplifiers connected to the respective edges be identical to provide accurate position detection in the sensor panel of the location at which a contact occurred. That is, the respective differential amplifiers should generate the same level of output signals in a common mode and the amplification of the respective differential amplifiers should be the same. However, it is difficult to make the characteristics of the differential amplifiers identical, due to manufacturing processes. Accordingly, position coordinates of the point at which contacts occur may not be precisely detected due to the difference between the characteristics of the differential amplifiers.

FIG. 1 contains two waveforms labelled (a) and (b) which illustrate a signal output by differential amplifiers when there is no contact in the sensor panel i.e., in the common mode, under two conditions. For these waveforms, it is assumed that the impedances at the respective edges of the sensor panel are the same. Waveform (a) is an output waveform showing output characteristics of the four differential amplifiers in the common mode when the amplifier characteristics are different. Waveform (b) is an output waveform showing the output characteristics of the four differential amplifiers in the common mode when the amplifier characteristics are identical.

In a conventional position coordinates detecting circuit of a general sensor panel using four differential amplifiers, the output signals of the four differential amplifiers are multiplexed so that the output signal of the differential amplifier corresponding to a selecting signal is generated. For example, in one general conventional sensor panel, the output signals of the differential amplifiers connected to the left upper edge, the left lower edge, the right upper edge, and the right lower edge of the sensor panel are output from sections T1, T2, T3, and T4, respectively, in response to a selecting signal. When the output characteristics of the four differential amplifiers are identical in the common mode, signals having the same levels are output from the sections T1 through T4, in which the output signals of the respective differential amplifiers are selectively output as shown in waveform (b) of FIG. 1.

In actuality, because of fabrication process deviations, it is very difficult to achieve the desired result that the output characteristics of the differential amplifiers are identical in the common mode. Accordingly, the levels of the output signals of the four differential amplifiers selectively output from the sections T1 through T4 are different from each other as shown in waveform (a) of FIG. 1. Therefore, in a conventional position coordinates signal detecting circuit, it is difficult to precisely detect position coordinates of the point on the sensor panel at which contacts occur.

Also, in a conventional position coordinates signal detecting circuit, not only the output characteristics in the common mode, but also the amplifying degrees of the differential amplifiers may be different from each other due to the process deviation. In this case, since the signals output from the respective edges of the sensor panel are amplified to different amplifications, the position at which the contact actually occurred cannot be precisely detected.

SUMMARY OF THE INVENTION

To solve the above problems, it is an object of the present invention to provide a position coordinates signal detecting circuit of a sensor panel having a simplified structure and correctly sensing coordinates using only one differential amplifier.

Accordingly, to achieve the above and other objects, there is provided a position coordinates signal detecting circuit of a sensor panel for detecting a position coordinates signal of a contact point in a sensor panel coated with a resistance component. The circuit includes a plurality of e.g., first through fourth, resistors one end of each of which is connected to an edge of the sensor panel, e.g., the left upper-most edge, the left lower-most edge, the right upper-most edge, and the right lower-most edge of the sensor panel, respectively. The circuit also includes a plurality, e.g., first through fourth, driving signal generators respectively connected to the other side of the resistors for generating a driving signal so as to drive the sensor panel. The circuit also includes an analog switching means for receiving a plurality, e.g., first through fourth pairs of voltages respectively generated at both ends of the resistors, multiplexing the pairs of voltage in response to a plurality of e.g., first through fourth, selecting signals and providing a multiplexed signal. The circuit also includes a differential amplifier for inputting and amplifying the multiplexed signal.

The position coordinates detecting circuit of the sensor panel according to the present invention makes it possible to amplify the voltage difference between both ends of the variable resistor. Thus, the characteristics mismatching between amplifiers is reduced, and the position coordinates are detected accurately.

BRIEF DESCRIPTIONS OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 contains waveforms showing the output signals of differential amplifiers according to the characteristics of differential amplifiers in a position coordinates signal detecting circuit of a sensor panel using four differential amplifiers.

FIG. 2 is a schematic block diagram of one embodiment of a position coordinates signal detecting circuit of a sensor panel according to the present invention.

FIG. 3 contains waveforms showing first through fourth selecting signals for controlling the output of an analog switching unit shown in FIG. 2 and the output signal of a differential amplifier.

DESCRIPTION OF THE PREFERRED EMBODIMENTS

Figure 1:
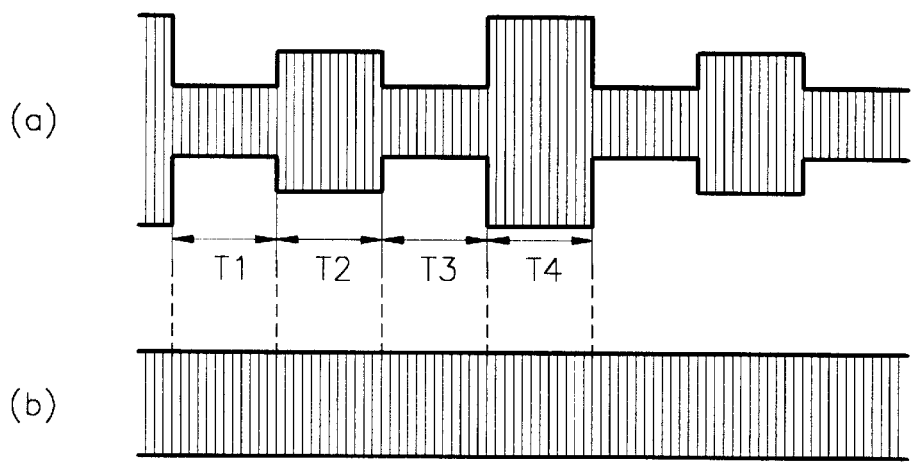
Figure 2:
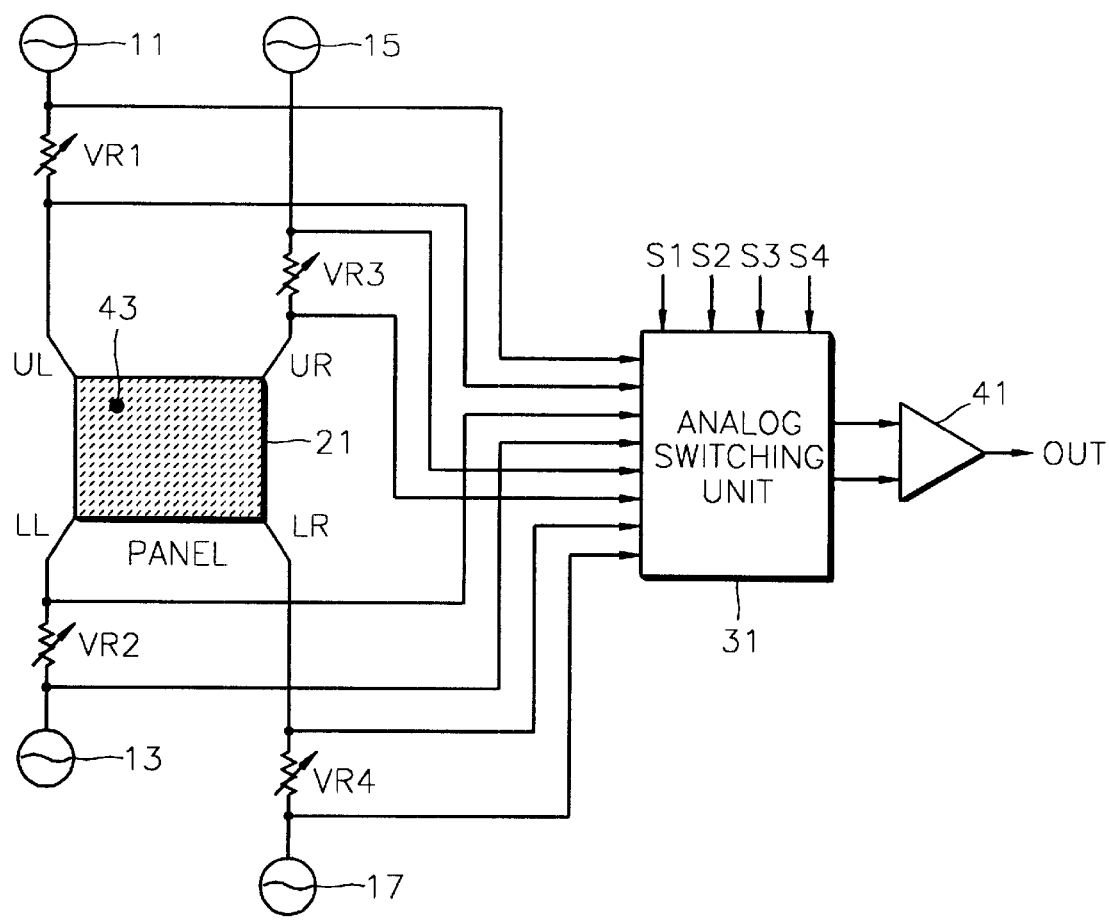

FIG. 2 is a schematic block diagram of one embodiment of a position coordinates signal detecting circuit of a sensor panel 21 according to the present invention. The position coordinates signal detecting circuit of the sensor panel 21 according to the present invention includes first through fourth driving signal generators 11, 13, 15, 17, first through fourth variable resistors VR1, VR2, VR3 and VR4, an analog switching unit 31, and a differential amplifier 41.

The first through fourth driving signal generators 11, 13, 15, 17 shown in FIG. 2, which are voltage generators for driving the senior panel 21, transmit analog driving signals having predetermined voltages (1V~4V) to the sensor panel 21 through the resistors VR1 through VR4, respectively. The resistors VR1, VR2, VR3 and VR4 are connected to the four edges UL, LL, UR, and LR, respectively, of the sensor panel 21, which is coated with a resistance component. When a contact occurs at an arbitrary point 43 of the sensor panel 21, the first through fourth voltages are generated from both ends of each respective resistor VR1 through VR4, corresponding to the point at which the contact occurred. The voltages generated from both ends of the respective resistors VR1 through VR4 are input to the analog switching unit 31 as shown.

The analog switching unit 31 receives the voltages generated from the ends of the resistors VR1 through VR4. The analog switching unit 31 sequentially outputs the voltages of both ends of the first through fourth resistors VR1 through VR4 to the differential amplifier 41 by multiplexing the voltages input in response to first through fourth selecting signals S1 through S4. The differential amplifier 41 amplifies a difference between the voltages of the first through fourth resistors VR1 through VR4 sequentially received from the analog switching unit 31 and generates the amplified voltages as the position coordinates signal of the contact point 43 generated in the sensor panel 21. That is, the contact point generated in the sensor panel 21 can be indicated by coordinates by detecting and amplifying the difference of the voltages of the first through fourth resistors VR1 through VR4.

In the present embodiment, when there is no contact in the sensor panel 21, variable resistors can be used as the first through fourth resistors VR1 through VR4 in order to control the input impedances of the respective edges UL, LL, UR, and LR of the sensor panel 21 to be the same. However, when there is no processing deviation in the sensor panel 21, namely, when there is no contact in the sensor panel 21 fixed resistors can be used when the maximum level and the minimum level of the output signal of the differential amplifier 41 are under a predetermined level (for example, 80 mV). When the fixed resistors are used instead of the variable resistors, it is possible to reduce time required for testing the position coordinates signal detecting circuit shown in FIG. 2.

Figure 3:
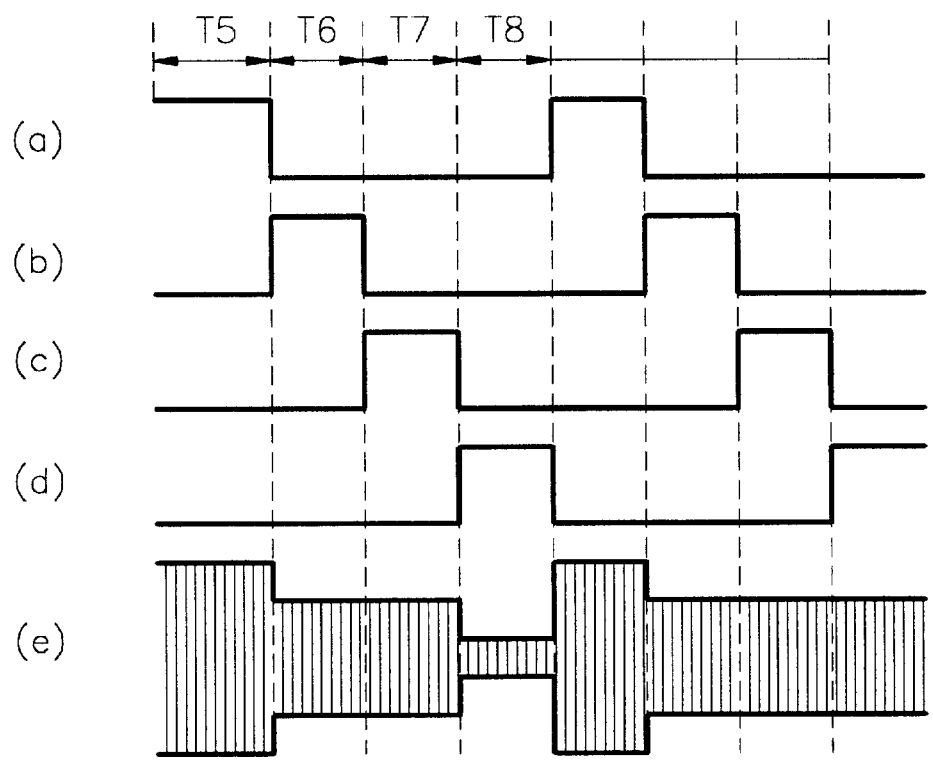

FIG. 3 contains waveforms labelled (a) through (e) which illustrate the first through fourth selecting signals S1 through S4 in Waveforms (a) through (d), respectively, for controlling the output of the analog switching unit 31 shown in FIG. 2 and the output signal of the differential amplifier 41 in waveform (e). Waveform (a) shows the first selecting signal S1 for controlling the analog switching unit 31 to select the voltage of both ends of the first resistor VR1. Waveform (b) shows a second selecting signal S2 for controlling the analog switching unit 31 to select the voltage of both ends of the second resistor VR2. Waveform (c) shows a third selecting signal S3 for controlling the analog switching unit 31 to select the voltage of both ends of a third resistor VR3. Waveform (d) shows a fourth selecting signal S4 for controlling the analog switching unit 31 to select the voltage of both ends of a fourth resistor VR4. Waveform (e) shows position coordinates signal of the contact point 43 output by the differential amplifier 41.

The operation of the position coordinates detecting circuit of the sensor panel according to the present invention will be described ii detail with reference to FIGS. 2 and 3. The respective edges UL, LL, UR, and LR of the sensor panel 21 are driven by alternating current voltages having predetermined voltage levels (1V through 4V) and input to the respective edges UL, LL, UR and LR through the respective registers VR1, VR2, VR3 and VR4.

As mentioned above, after controlling the first through fourth resistors VR1 through VR4 so that the level of the voltage of the output of the differential amplifier 41 is uniform in an initial state in which the contact does not occur in the sensor panel 21, when the contact by a finger occurs at an arbitrary point of the sensor panel 21 coated with the resistance component, the finger functions as a condenser. Therefore, the amount of current flow through the both ends of the first through fourth resistors VR1 through VR4 are different from each other. Accordingly, the voltage differences are generated in the both ends of the first through fourth resistors VR1 through VR4. The difference of the pair of voltages is generated in the both ends of the first through fourth resistors VR1 through VR4. The pairs of voltage are respectively input to the analog switching unit 31.

The pairs of voltage of the both ends of the first through fourth resistors VR1 through VR4 input to the analog switching unit 31 are sequentially output in response to the first through fourth selecting signals S1 through S4 which have a predetermined duty cycle (for example, T5, T6, T7 and T8 are all 1.25 ms) and are sequentially enabled, as shown in waveforms (a) through (d) of FIG. 3. The differential amplifier 41 receives the pairs of voltages of the both ends of the first through fourth resistors VR1 through VR4 sequentially generated from the analog switching unit 31, amplifies the voltage differences, and provides the amplified signal to an output terminal OUT as the position coordinates signal as shown in waveform (e) of FIG. 3.

As shown in waveforms (a) through (e) of FIG. 3, since the pairs of voltages of both ends of the first through fourth resistors VR1 through VR4 connected to the respective edges of the sensor panel 21 are input to the differential amplifier 41 in response to the first through fourth selecting signals S1 through S4 which have a predetermined duty, for example, 1.25 ms and are sequentially enabled, the position coordinates signal of the contact point generated in the sensor panel 21 can be output in a period of 5 ms in this particular exemplary embodiment.

For example, as shown in FIG. 2, when the contact point 43 is generated in the sensor panel 21, capacitances are formed between the contact point 43 and the respective edges of the sensor panel 21 and the capacitances of the capacitor vary according to a distance between the respective edges and the contact point 43. As a result, the pairs of voltage of the both ends of the first through fourth resistors VR1 through 4 connected to the respective edges UL, LL, UR, and LR may be different. To the contact paint 43 shown in FIG. 2, the nearest edge is the left upper UL, and the furthest edge is the right lower edge LR. And the contact point 43 is located at the almost same distance from the left lower edge LL and the right upper edge UR. In this case, the capacitance between the left upper edge UL and the contact point 43 is smallest. The capacitance between the right lower edge LR and the contact point 43 is largest. The capacitances between the left lower edge LL and the right upper edge UR are almost same.

The capacitances between the contact point 43 and the respective edges UL, LL, UR, and LR of the sensor panel 21 are respective serially connected to the first through fourth resistors VR1 through VR4 and change the pairs of voltages of both ends of them. In the case of the contact point 43 shown in FIG. 2, since the capacitance of the capacitor serially connected to the resistor VR1 among the first through fourth resistors VR1 through VR4 is the smallest value, the pairs of voltages at the ends of the first resistor VR1 are the largest among the pairs of voltage at the ends of the first through fourth resistor VR1 through VR4. Also, since the capacitance of the capacitor serially connected to the fourth resistor VR4 is the largest value, the pairs of voltages at the ends of the fourth resistor VR4 is the smallest. Therefore, the differential amplifier 41 generates the output signal having the largest level as shown in waveform (e) of FIG. 3 in the section T5 in which the analog switching unit 31 selectively outputs the pair of voltages at the ends of the first resistor VR1, in response to the first selecting signal S1 shown in waveform (a) of FIG. 3. Also, as shown in waveform (e) of FIG. 3, the differential amplifier 41 generates an output signal. The level of the output signal in sections T6 and T7 is lower than that of the output signal in section T5. In sections T6 and T7, the analog switching unit 31 selectively generates the pairs of voltage received from the second and third resistors VR2 and VR3, in response to the second and third selecting signals S2 and S3 shown in waveforms (b) and (c) of FIG. 3. Also, as shown in waveform (e) of FIG. 3, the differential amplifier 41 generates an output signal having the lower level in a section T8. In the section T8, the analog switching unit 31 selectively generates the voltage received from the fourth resistor VR4, in response to the fourth selecting signal S4 shown in waveform (d) of FIG. 3. The position coordinates of the contact point 43 are detested by the output signals of the differential amplifier 41, generated in the sections T5, T6, T7, and T8.

In the present invention, since the pars of voltage at the ends of the first through fourth resistors VR1 through VR4 are transferred the input terminal of the differential amplifier 41 the analog switching unit 31, one differential amplifier is sufficient. Therefore, using the position coordinates signal detecting circuit of the invention, the problem of inaccurate position coordinates found in prior systems due to amplifier mismatch, i.e., output level differences between the amplifiers and amplifying degree differences between the amplifiers in the common mode, are virtually eliminated.

Figure 4:
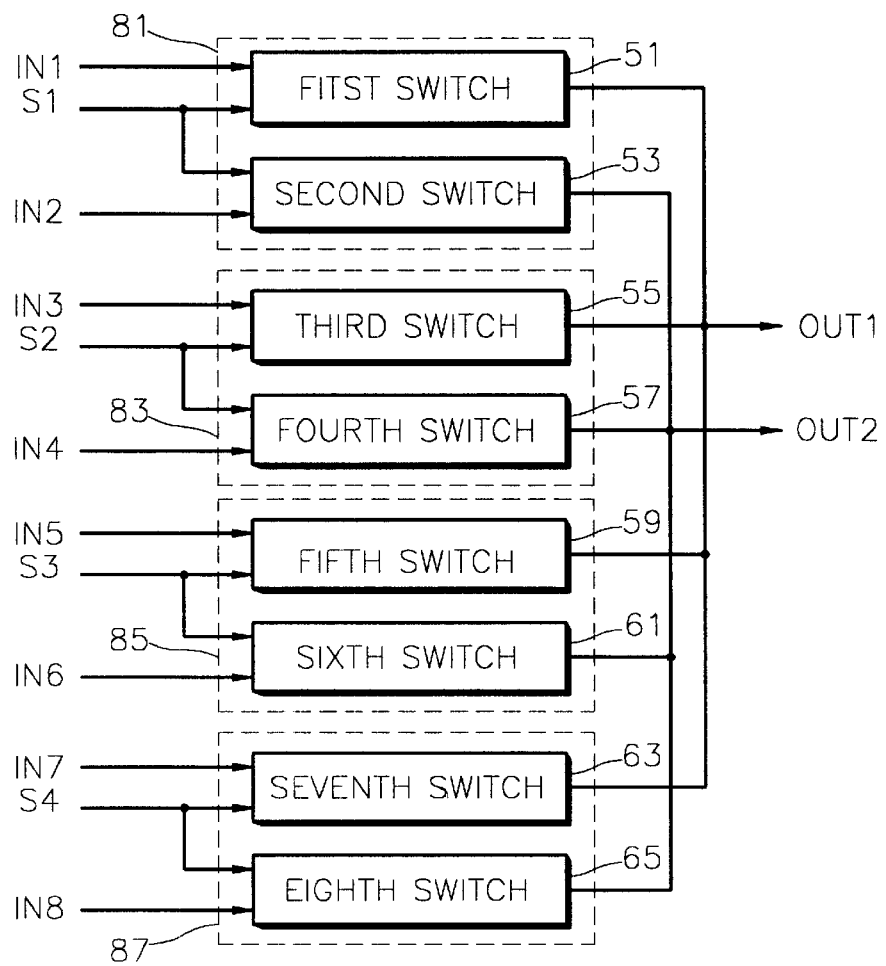
FIG. 4 is a block diagram showing an analog switching unit of a circuit shown in FIG. 2.

FIG. 4 contains a schematic block diagram illustrating the analog switching unit 31 of the circuit shown in FIG. 2. The analog switching unit 31 according to the present invention includes first through fourth switching units 81, 83, 85 and 87. Each switching unit includes two switches.

The first switching unit 81 shown in FIG. 4 respectively receives the pair of voltages at the ends of the first resistor VR1 shown in FIG. 2 at a first input terminal IN1 and a second input terminal IN2 and selectively generates and outputs the pair of voltages at the ends of the first resistor VR1 in response to the first selecting signal S1. The second switching unit 83 receives the pair of voltages at the both ends of the second resistor VR2 shown in FIG. 2 through a third input terminal IN3 and a fourth input terminal IN4. The second switching unit 83 selectively generates and outputs the pair of voltages at the ends of the second resistor VR2 in response to the second signal S2. Also, the third switching unit 85 receives the pair of voltages at the ends of the third resistor VR3 shown in FIG. 2 through a fifth input terminal IN5 and a sixth input terminal IN6. The third switching unit 85 selectively generates and outputs the pair of voltages at the ends of the third resistor VR3 in response to the third selecting signal S3. The fourth switching unit 87 receives the pair of voltages at the ends of the fourth resistor VR4 shown in FIG. 2 through a seventh input terminal IN7 and an eighth input terminal IN8. The fourth switching unit 87 selectively generates and outputs the pair of voltages at the ends of the fourth resistor VR4 in response to the fourth selecting signal S4.

A first switch 51 included in the firs switching unit 81 receives the voltage level of a terminal of the first resistor VR1 through the input terminal IN1 as a first voltage level and selectively generates and forwards the first voltage level to the output terminal OUT1 in response to the first selecting signal S1. A second switch 53 inputs the voltage level of the other terminal of the first resistor VR1 as a second voltage level and selectively generates the second voltage level to the output terminal OUT2 in response to the first selecting signal S1. Since the operations of third through eighth switch 55, 57, 59, 61, 63 and 65 included in the second through fourth switching units 83, 85 ant 87 are the same as those of the first and second switches 51 and 53 included in the first switching unit 81, descriptions thereof will be omitted.

Figure 5:
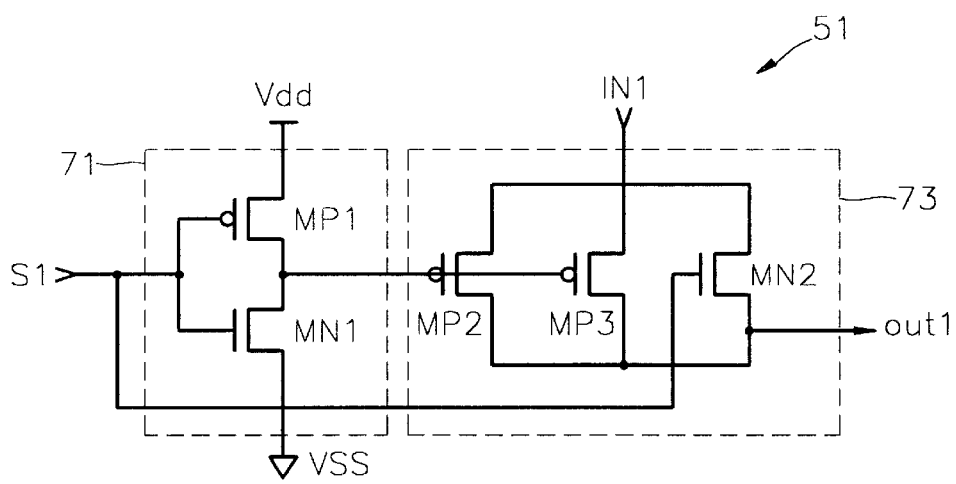
FIG. 5 is a circuit diagram of a first switch shown in FIG. 4.

FIG. 5 is a circuit diagram of one embodiment of each of the switches 51, 53, 55, 57, 59, 61, 63 and 65 shown in FIG. 4. The switch 51 includes an inverter 71 including a first PMOS transistor MP1 and a first NMOS transistor MN1 and a transfer gate 73 including second and third PMOS transistors MP2 and MP3 and a second NMOS transistors MN2.

The inverter 71 receives the first selecting signal S1 through the gates of the first PMOS transistor MP1 and the first NMOS transistor MN1 and generates the inverted first selecting signal to a drain. The transfer gate 73 outputs the first voltage level which is voltage level of the terminal of the first resistor VR1 input to the sources of the respective transistors MP2, MP3 and MN2 through the drain, in response to the inverted first selecting signal received through the gates of the second and third PMOS transistors MP2 and MP3 and the first selecting signal S1 received through the gate of the second NMOS transistor MN2.

For example, when the first selecting signal S1 of a "high" logic level is input through the inverter 71, the second and third PMOS transistors MP2 and MP3 and the second NMOS transistor MN2 of the transfer gate 73 are timed on by an inverted first selecting signal of a "low" logic level and the first selecting signal S1 of the "high" logic level. Accordingly, the first voltage level received through the input terminal IN1 is transmitted to the output terminal OUT1. When the first selecting signal S1 of the "low" logic level is received, the second and third PMOS transistor MP2 and MP3 and the second NMOS transistor MN2 of the transfer gate 73 are turned off by the inverted first selecting signal of the "high" logic level and the first selecting signal S1 of the "low" logic level. Accordingly, the first voltage level received the input terminal IN1 is not transmitted to the output terminal OUT1.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An apparatus for detecting position coordinates of a contact point in a sensor panel coated with resistance component, comprising:
   a plurality of resistors, each resistor having a first end connected to an edge of the sensor panel;
   a plurality of driving signal generators, each driving signal generator being connected to a respective second en of one of the plurality of resistors for generating a driving signal so as to drive the senor panel connected to the first ends of the resistors;
   an analog switching unit for (i) receiving a plurality of pairs of voltages corresponding respectively to the plurality of resistors, each voltage of each pair of voltages being generated at one of the first and second ends of the corresponding resistor, (ii) multiplexing the pairs of voltages in response to selecting signals, and (iii) providing a multiplexed output signal, the multiplexed output signal including a single selected one of the pairs of voltages, the analog switching unit comprising:
   a plurality of pairs of switching circuits receiving respective ones of the pairs of voltages, each switching circuit of one of the pairs of switching circuits receiving one of pair of voltages received by the pair of switching circuits, and
   a plurality of select circuits associated with respective pairs of switching circuits, each selection circuit being actuable by the selection signal to apply its respective pair of voltages to an output of the analog switching unit to generate the multiplexed output signal; and
   a single differential amplifier for receiving the multiplexed output signal and for amplifying the multiplexed output signal, such that the single differential amplifier is used to amplify all of the pairs of voltages from the analog switch one at a time as each of the pairs of voltages is selected in response to the selecting signal.

2. The apparatus of claim 1, wherein the resistors are variable resistors.

3. The apparatus of claim 1 wherein the analog switching unit comprises a plurality of switches for receiving the pairs of voltages and selectively outputting one of the pairs of voltages in response to select signal.

4. The apparatus of claim 3, wherein each switch comprises:
   a first switch for receiving the voltage level at one of the first and second ends of a corresponding resistor among the plurality of resistors as a first voltage level and selectively providing the first voltage level in response to the select signal; and
   a second switch for receiving the voltage level at the other of the first and second ends of the corresponding resistor as a second voltage level and selectively providing the second voltage level in response to the select signal.

5. The apparatus of claim 4, wherein each of the first and second switches comprises:
   an inverter for receiving and inverting the select signal and providing an inverted select signal; and
   a transfer gate for selectively outputting a voltage level input in response to the select signal and the inverted select signal.

6. The apparatus of claim 1 comprising four resistors each of which is connected to one of four edges of the sensor panel.

* * * * *

UNITED STATES PATENT AND TRADEMARK OFFICE
CERTIFICATE OF CORRECTION

PATENT NO. : 6,489,575 B2
DATED : December 3, 2002
INVENTOR(S) : Do-youn Kim

It is certified that error appears in the above-identified patent and that said Letters Patent is hereby corrected as shown below:

<u>Column 7,</u>
Line 37, please insert -- a -- before "resistance".
Line 43, please delete "en" and insert -- end --.

<u>Column 8,</u>
Line 9, please delete "select" and insert -- selection --.

Signed and Sealed this

Twelfth Day of August, 2003

JAMES E. ROGAN
*Director of the United States Patent and Trademark Office*